(12) United States Patent
Jiang et al.

(10) Patent No.: US 8,266,142 B2
(45) Date of Patent: Sep. 11, 2012

(54) AUDIO/VIDEO FINGERPRINT SEARCH ACCURACY USING MULTIPLE SEARCH COMBINING

(75) Inventors: Wenyu Jiang, San Francisco, CA (US); Claus Bauer, San Francisco, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 207 days.

(21) Appl. No.: 12/663,057

(22) PCT Filed: Jun. 4, 2008

(86) PCT No.: PCT/US2008/007054
§ 371 (c)(1),
(2), (4) Date: Mar. 26, 2010

(87) PCT Pub. No.: WO2008/150544
PCT Pub. Date: Dec. 11, 2008

(65) Prior Publication Data
US 2010/0205174 A1   Aug. 12, 2010

Related U.S. Application Data

(60) Provisional application No. 60/933,614, filed on Jun. 6, 2007.

(51) Int. Cl.
*G06F 17/30* (2006.01)

(52) U.S. Cl. .................. 707/725; 707/914; 707/915

(58) Field of Classification Search .................. 707/725, 707/914, 915, 999.003
See application file for complete search history.

(56) References Cited

U.S. PATENT DOCUMENTS 5,715,518 A * 2/1998 Barrere et al. ................. 340/5.8
6,181,807 B1 * 1/2001 Setlak et al. .................. 382/124
7,013,301 B2 * 3/2006 Holm et al. .................... 707/741
7,127,106 B1 * 10/2006 Neil et al. ...................... 382/181
7,277,766 B1 * 10/2007 Khan et al. ...................... 700/94
7,519,954 B1 * 4/2009 Beddoe et al. ................ 717/124
7,899,625 B2 * 3/2011 Bhanot et al. ................... 702/19

(Continued)

FOREIGN PATENT DOCUMENTS

CN   1592906   3/2005

(Continued)

OTHER PUBLICATIONS

Avery Li-Chun Wang, "An Industrial-Strength Audio Search Algorithm", In Proceedings of the International Symposium on Music Information Retrieval (ISMIR), 2003, 7 pages, accessed online at <http://www.ee.columbia.edu/~dpwe/papers/Wang03-shazam.pdf> on Dec. 14, 2011.*

(Continued)

*Primary Examiner* — Phuong Thao Cao

(57) ABSTRACT

A method for use in identifying a segment of audio and/or video information comprises obtaining a query fingerprint at each of a plurality of spaced-apart time locations in said segment, searching fingerprints in a database for a potential match for each such query fingerprint, obtaining a confidence level of a potential match to a found fingerprint in the database for each such query fingerprint, and combining the results of searching for potential matches, wherein each potential match result is weighted by respective confidence level. A confidence level may be a function of at least one or both of (1) a measure of difference between a query fingerprint and a found fingerprint and (2) the relative timing relationship between the time location of a query fingerprint and the time location of a found fingerprint.

10 Claims, 4 Drawing Sheets

U.S. PATENT DOCUMENTS

| | | | |
|---|---|---|---|
| 7,907,211 B2* | 3/2011 | Oostveen et al. | 348/515 |
| 7,970,644 B2* | 6/2011 | Hedley et al. | 705/13 |
| 8,023,773 B2* | 9/2011 | Brunk et al. | 382/305 |
| 2002/0083060 A1* | 6/2002 | Wang et al. | 707/10 |
| 2002/0178410 A1* | 11/2002 | Haitsma et al. | 714/709 |
| 2003/0229641 A1* | 12/2003 | Kamath et al. | 707/100 |
| 2004/0153444 A1* | 8/2004 | Senders et al. | 707/3 |
| 2004/0258280 A1* | 12/2004 | Merry et al. | 382/115 |
| 2006/0229878 A1* | 10/2006 | Scheirer | 704/273 |
| 2006/0265402 A1* | 11/2006 | Edmond et al. | 707/10 |
| 2007/0071330 A1* | 3/2007 | Oostveen et al. | 382/228 |
| 2007/0083370 A1* | 4/2007 | Scarano et al. | 704/254 |
| 2007/0143778 A1* | 6/2007 | Covell et al. | 725/19 |
| 2008/0154401 A1* | 6/2008 | Wang | 700/94 |
| 2008/0209502 A1* | 8/2008 | Seidel | 726/1 |
| 2008/0270138 A1* | 10/2008 | Knight et al. | 704/260 |
| 2009/0006337 A1* | 1/2009 | Cheung | 707/3 |
| 2009/0226148 A1* | 9/2009 | Nesvadba et al. | 386/95 |

FOREIGN PATENT DOCUMENTS

| | | |
|---|---|---|
| FR | 2863080 A | 6/2005 |
| WO | 03009277 A | 1/2003 |
| WO | 20050050620 A | 6/2005 |

OTHER PUBLICATIONS

Haitsma et al., "A Highly Robust Audio Fingerprinting System", In Proceedings of the International Symposium on Music Information Retrieval (ISMIR), 2002, 9 pages, accessed online at <http://ismir2002.ismir.net/proceedings/02-fp04-2.pdf> on Dec. 14, 2011.*

Lee et al., "Robust Video Fingerprinting for Content-Based Video Identification", IEEE, 2007, 8 pages, accessed online through Google search.*

Cano, P., et al., "A review of algorithms for audio fingerprinting", Proceedings of the 2003 IEEE Radar Conf., Huntsville, AL, May 5-8, 2003, IEEE Radar Conf. New York, NY, Dec. 9, 2002, pp. 169-173.

Welsh, M., et al., "Querying Large Collections of Music for Similarity", UC Berkeley Technical Report, XX, XX, No. 1096, Nov. 1, 1999, entire document.

EPO ISA, Notification of Transmittal of the Int'l Search Report and the Written Opinion of the Intl Searching Authority, or the Declaration PCT/US2008/007054, data of mailing Oct. 13, 2008.

* cited by examiner

AUDIO/VIDEO FINGERPRINT SEARCH ACCURACY USING MULTIPLE SEARCH COMBINING

TECHNICAL FIELD

The invention relates to audio and video fingerprinting. More particularly the invention relates to improving the accuracy of fingerprint search accuracy.

BACKGROUND ART

With the rapid growth of digital content, there is an increasing demand for properly managing and locating the content. One prospective application is identifying an excerpt of audio or video within a repository of known content. This can be useful in monitoring illegal download/transfer of content on the Internet. It can also be useful in providing intelligent access to content that users are listening to or watching and are interested in, but for which they do not know the title or author information. The user can, for example, place a cell phone against the loudspeaker currently playing a song, and let the cell phone operator's software find out the song's title, its artist and album information, etc.

Such identification capability is generally implemented by first generating feature information (called fingerprints) designed to identify uniquely audio and video signals, and then performing some form of pattern matching search between the fingerprints from the repository/database and those from the excerpt in the search query. Such a database is often implemented in the form of a search tree, although other data structures are also possible. Generally, each fingerprint corresponds to a certain segment of audio or video. So a two second audio fingerprint would correspond to a two second segment of audio. A fingerprint is usually implemented as a concatenation of small blocks of feature information that are often called signatures. A two second fingerprint may, for example, consist of two hundred 10 millisecond (ms) long signatures, wherein each signature is computed from 10 ms of new audio or video information. The pattern matching of fingerprints is therefore a process of comparing corresponding signatures. This is illustrated in FIG. 1 that shows the creation of a fingerprint from signatures.

In order to perform proper pattern matching between a fingerprint from a query excerpt and those from the database, it is crucial to have proper time alignment between the two during a comparison. To ensure that, usually all fingerprints starting at every possible time offset are added to the database to guarantee that at least one of them will have time alignment that is close enough to the query fingerprint. If a signature is 10 ms long, then a two second fingerprint is shifted every 10 ms over a two second sliding window and then added to the database. This is also illustrated in FIG. 1, and in this case it creates a 99.5% overlap between successive fingerprints, but such redundancy is usually required to ensure good search performance. For any remaining time misalignment less than 10 ms (or in general the duration of each signature), a well-designed fingerprint generation method should select whichever signature is closer in terms of timing to better match the corresponding signature from the query. In short, the goal of a fingerprint search system is to find a query fingerprint's corresponding counterpart fingerprint, and the counterpart should minimize its time misalignment with the query fingerprint, if such misalignment exists at all.

Because the query excerpt may have undergone some editing or processing steps, such as recapturing sound played from a loudspeaker using a cell phone, there may be some distortions in the captured audio/video signals. As a result, the resulting fingerprints may also change slightly with respect to their counterparts in the database, assuming there is a counterpart.

The possibility of distortions in the excerpt means the best match in such a search is often not an identical match, but a form of closest match. To define the closest match requires the definition of a measure of difference between two fingerprints. For example, a commonly used measure of difference is the Hamming distance, that is, the number of differing bits between the fingerprint from the query excerpt and that from the database. With this definition of measure of difference, the corresponding criterion for the closest match is thus the fingerprint from the database that has the minimum Hamming distance from the fingerprint from the query excerpt. The Hamming distance between two fingerprints divided by the number of bits in a fingerprint is often referred to as the bit error rate (BER). The BER is an example of measure of relative difference. The minimum Hamming distance criterion works well when the BER between the fingerprint from the excerpt and its counterpart is small. However, as BER increases, the search result producing the minimum Hamming distance increasingly does not find the actual counterpart. Fortunately, in most fingerprint search applications, it is only necessary to identify the correct audio/video piece, but not necessarily the corresponding segment. But when BER increases further, the search result may even find the wrong audio/video piece, let alone the correct segment within that piece. The BER depends on both the level of distortion in the query excerpt, and the robustness of the fingerprint extraction method with respect to such distortions.

Furthermore, it is possible that an excerpt does not belong to any piece in the database. For example, the excerpt may be the recording of a new composition of music. Because no search algorithm can know beforehand (without being told) whether an excerpt belongs to the database or not, the best it can do is still apply the same criterion of minimum Hamming distance, but expecting that the minimum Hamming distance found in such cases will be much more different (preferably higher) than that of an excerpt originally from the database, and use some threshold to determine whether the excerpt is from the database.

Therefore, there are three possible outcomes after a single search operation (wherein only one query fingerprint is used to search the database), before applying any thresholds (for example in terms of BER):

1. The excerpt belongs to the database, and the search returns the correct audio/video piece (finding the correct piece is enough, here it is not necessary to find the correct counterpart segment).
2. The excerpt belongs to the database, and the search returns the wrong audio/video piece.
3. The excerpt does not belong to the database, and because the search always returns some audio/video piece, the answer will always be wrong.

FIG. 2 shows an example of BER distribution for three different possible outcomes of a single search. Each of these outcomes would generate a corresponding probability-density-function (PDF) distribution of the BER. For a well-designed fingerprint extraction algorithm, the BER of the first outcome should generally be smaller than the BER of the second and third outcomes, as illustrated in FIG. 2.

However, if the BER of the second and third outcomes have very similar PDF distributions, it would be difficult to distinguish between an excerpt belonging to the database but having a wrong search result, and an excerpt that doesn't belong there. Furthermore, for pieces originally from the database, after applying common audio/video distortions such as codec compression, the search result in a typical implementation is correct (in terms of identifying the correct piece) usually ranges from 90 to 99%, depending on the fingerprint duration and the type of distortions, before applying any BER threshold. This is good but a higher level of accuracy is certainly desirable, and after applying BER thresholding (say at BER=0.2 in FIG. 2), the ratio of correct search results only decreases slightly because the tail of the BER distribution of outcome one is discarded to avoid falsely picking up too much of the head distribution of outcome two. This means tweaking the BER threshold alone cannot lead to very high accuracy (say 99.9%) in a single search.

DISCLOSURE OF THE INVENTION

Figure 1:
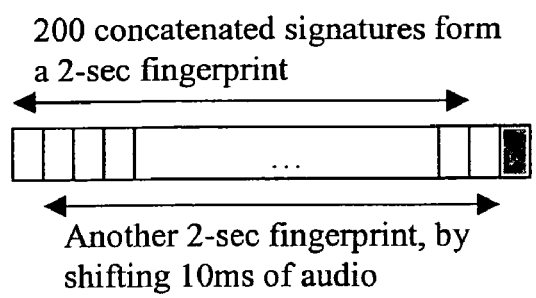
FIG. 1 is a schematic example of the manner in which a particular type of fingerprint may be generated.
Figure 2:
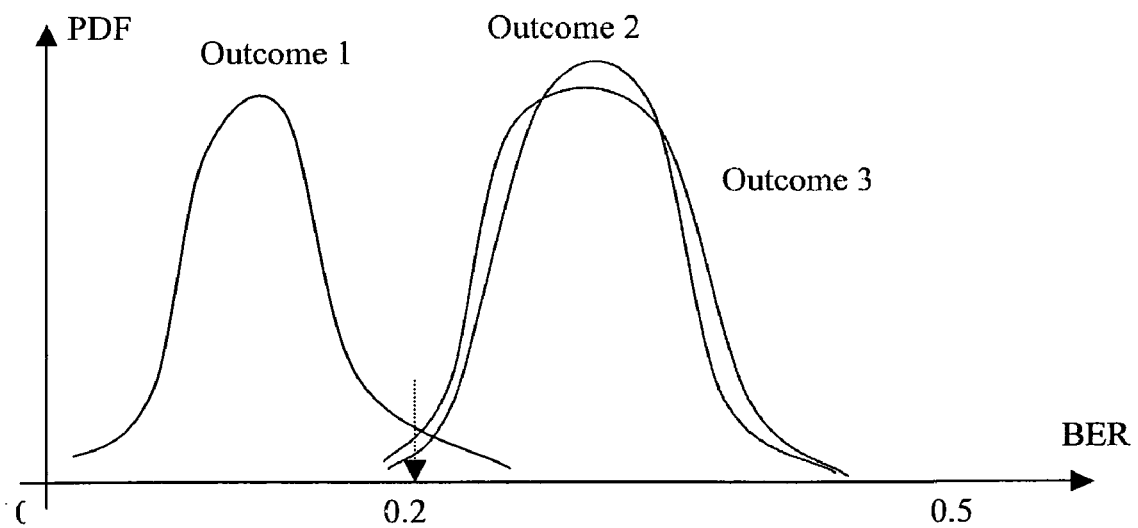
FIG. 2 shows an idealized example of a probability-density-function (PDF) as a function of the bit error rate (BER) that may result for each of three possible outcomes of a single fingerprint matching search.

In accordance with aspects of the present invention, a method for use in identifying a segment of audio and/or video information comprises obtaining a query fingerprint at each of a plurality of spaced-apart time locations in said segment, searching fingerprints in a database for a potential match for each such query fingerprint, obtaining a confidence level of a potential match to a found fingerprint in the database for each such query fingerprint, and combining the results of searching for potential matches, wherein each potential match result is weighted by a respective confidence level.

A confidence level may be a function of at least one or both of (1) a measure of difference between a query fingerprint and a found fingerprint and (2) the relative timing relationship between the time location of a query fingerprint and the time location of a found fingerprint. The measure of difference may be based on Hamming distance, or its relative difference variant such as the bit error rate, or it may be based on an Lp norm in which a p-th root of the sum of the p-th power of absolute values of difference over each dimension of a vector that constitutes a fingerprint is obtained. The Lp norm measure may be an L2 norm difference measure in which a square root of the sum of the square of absolute values of difference is obtained. As a further alternative, the measure of difference may be obtained by auto-correlation in which the value of correlation indicates the closeness of the match.

The confidence level may be a combination of respective confidence levels of each of a function of at least one or both of (1) the measure of difference between a query fingerprint and a found fingerprint and (2) the relative timing relationship between the time location of a query fingerprint and the time locations of a found fingerprint. The combination of the respective confidence levels may be, for example, a summation of respective confidence levels or a multiplicative product of respective confidence levels.

A confidence level may be a function of at least the relative timing relationship between the time location of the query fingerprint and the time location of the potentially matching found fingerprint in the database, in which case there are at least three spaced-apart time locations.

The spaced-apart time locations in the segment of audio and/or video information may be spaced apart so as to minimize correlation between or among query fingerprints.

There may be multiple sets of spaced-apart time locations with respect to each of which sets the results of searching for potential matches is combined. The results of searching may be combined within each set and the results of such combinations then may be further combined. Alternatively, the results of searching may be combined across all sets.

Fingerprints in the database may have related metadata about said audio and/or video information. Such metadata may include at least a piece title of the audio and/or video information.

A query fingerprint may be obtained at each of said plurality of spaced-apart time locations in substantially the same way.

Figure 3:
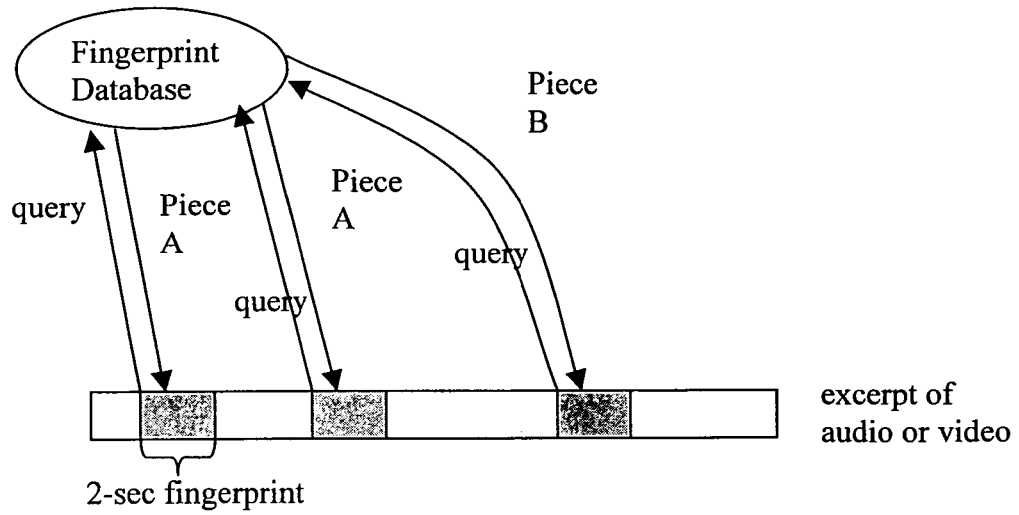
FIG. 3 is a schematic conceptualization of an example of fingerprint-matching search results combining using majority voting with respect to three searches.

A simple but useful method of combining results from multiple searches is majority voting. For example, as illustrated in FIG. 3, if one conducts three searches, two of them return piece A, one returns piece B, then we conclude that the final search result should be piece A. If we get three different answers, piece A, B and C, then there is no majority winner, and the answer is inconclusive. In this case, it is best to conclude that the excerpt does not belong to the database, because if it did belong, it is relatively unlikely three searches will give three different results.

This can be generalized to any number of searches, using majority voting (wherein the piece getting more than half of the votes wins) as illustrated by the pseudocode shown below, or any voting scheme desired by the implementer (for example the piece with the most votes and without a tie wins). A voting scheme should be designed to maximize the number of correct answers and minimize the number of wrong answers, using probabilistic analysis. For example, for pieces originally from the database, if a single search has 98% accuracy, then combining three searches with majority voting will draw the wrong conclusion only if at least two out of three searches are wrong, which is $3 \times 0.98 \times 0.02^2 + 0.02^3 \approx 1.2 \times 10^{-3}$, so the combined accuracy should be almost 99.9%. This probabilistic analysis assumes each search to be independent of other searches, i.e., no correlation between searches.

Exemplary pseudocode for search combining using majority voting may be expressed as follows:

N = 3;
Do N fingerprint searches, at time t, t+d[1], ..., t+d[N−1] of the excerpt, respectively;
If (> N/2 searches return the same piece A)
  Return pieceA;
Else
  Return "excerpt does not belong to the database";

The time intervals d[1], d[2], . . . , in FIG. 3 are used to conduct searches at different locations, and, in general, they should be chosen to minimize the overlaps among their corresponding search segments in order to reduce any undesirable correlation between search results. The combining process can be further cascaded by additional iteration(s) of multiple search(es) in the event of inconclusive votes, and either consider the votes in the new iteration only, or combine some or all of the previous votes with a voting scheme chosen by the implementer.

It would seem that a simple scheme like majority voting can give very good results. The example above suggests an accuracy of almost 99.9%, but the actual accuracy may be only marginally better than the original 98% when there is strong burstiness or correlation of errors in the search: if one search gives the wrong result, a search at a nearby time location will likely give the wrong result as well, and often the same wrong result. This can happen for example due to certain regions of audio/video (such as high-motion segments in video or quiet audio signals) being more sensitive to distortion (low bit-rate compression or background noise, respectively). This would mislead a majority decision algorithm into thinking it found the right answer, when it has not. In addition, if a piece does not belong to the database, one must also deal with the case where more than one search may return the same piece, since it would result in a wrong majority winner.

Accuracy may be increased, even in the presence of such burst errors, by employing aspects of the present invention. This may be accomplished, for example, by combining not only the piece's title information from each search result, but also accessory information such as the time location of the found segment within the found piece, and the BER of the search result. For example in FIG. 4(a), if two of three searches return piece A, and the time locations of these two search segments differ by five seconds, then the time locations of the found segments in these two search results should also differ by five seconds (or within a certain error margin). If this is not satisfied, as in FIG. 4(b), it is almost certain that this is a false majority winner. This is a fair assumption because if a search returns the wrong piece, it is almost certainly due to accident that it happens to be the result producing the minimum Hamming distance. Therefore, the time location of the found segment should be relatively random, rather than deterministic. And consequently, the probability that two wrong search results returning the same wrong piece and a pair of consistently close time locations is fairly low. The exact probability can be estimated by analyzing the PDF distribution of the time locations of both correct and wrong search results.

To generalize this comparison with N searches, it means the differences between the time locations of those searches should also be the same or close across the queries and the search results. However, to make this comparison easier to implement in software, one can calculate the offset (i.e., difference) between the time locations of the original piece and the excerpt in a search result, and this value is referred to as $t_{offset}$ in FIGS. 4(a) and 4(b). The offset for the first search is $t_{offset,1}$, for the second search is $t_{offset,2}$, respectively. For each pair of search results that return the same piece, one may calculate the difference between their $t_{offset}$. Then, for the pair that achieves the minimum difference, if such minimum difference is less than a certain threshold (say 0.2 sec), its piece title may then be considered the final answer. This is illustrated in the following pseudocode for search combining using accessory information, where Min_t_offset_dist is the minimum difference, and Candidate indicates for which (pair of) search this minimum is achieved. A threshold d_A with an example value of 0.2 seconds is used to determine whether the result is trustable enough.

Exemplary pseudocode for search combining using $t_{offset}$ accessory information may be expressed as follows:

```
N = 3;
Do N fingerprint searches, at time t, t+d[1], ..., t+d[N−1] of the excerpt,
respectively;
Min_t_offset_dist = min(t_offset,i − t_offset,j,
  where search[i].piece == search[j].piece,i < j);
Candidate = arg_i min(t_offset,i − t_offset,j,
  where search[i].piece == search[j].piece,i < j);
d_A = 0.2;
If (Min_t_offset_dist < d_A && Candidate has > N/2 votes)
  Return search[Candidate].piece;
Else
  Return "excerpt does not belong to the database";
```

In the above pseudocode, "search[i]" means the result from the i-th search and "search[i].piece" is the found piece's identification information such as its title. A more generalized way to use accessory information timing information, described below, employs a time measure $t_{distance}$ rather than $t_{offset}$.

For a large N number of searches, clearly the value of Min_t_offset_dist would be smaller if more of the searches return the same piece, provided that the result is correct. For instance, all else being equal, the minimum value among five samples is certainly smaller than the minimum value among three samples. So, we can define more thresholds, e.g., d_B, d_C, in addition to d_A, depending on how many searches return the same piece. This way, one can use the accessory information ($t_{offset}$ in this example) intelligently based on the majority voting information (how many searches return the same piece), and achieve higher accuracy.

Figure 6:
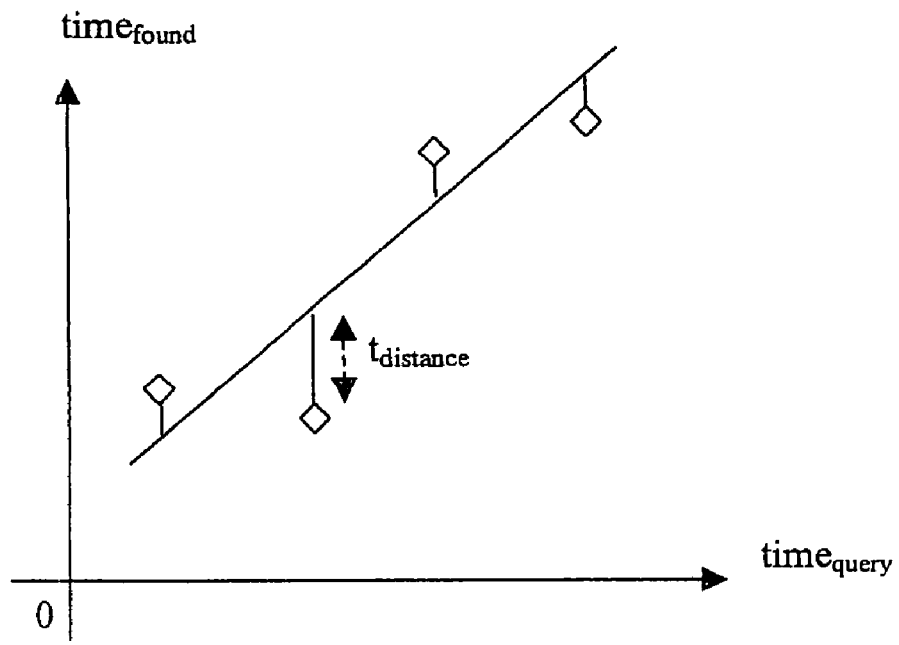
FIG. 6 is an idealized example useful in understanding one way, using linear regression in this example, that relative time locations between the time of the fingerprint query and the time of the fingerprint found in a database may be determined.

If the query material has experienced some speed-up or speed-down, which is sometimes the case in radio programs, the spacing between the query fingerprints versus the spacing between the fingerprints from the search results will no longer be the same. Instead they will drift apart slowly with respect to the spacing between the query fingerprints. To deal with this, one can either make sure that the spacing between the query fingerprints will never cause the deviation of $t_{offset}$ to exceed a threshold such as d_A. Or, if one has a sufficient number of votes, one can observe the timing correlation between the query fingerprints and the fingerprints from the search results, which should produce a linear trend with a slope slight higher or lower than one depending on whether it experienced speed-up or speed-down, assuming no other distortions would contribute to errors in the timing of fingerprints from the search results. Then, we can use a measure of confidence of the linear trend (such as based on linear regression) to determine the confidence of the combined result. An example of such a linear regression is shown in FIG. 6 discussed below.

Similar to the concept of $t_{offset}$, if the BER in a search result is very low, which indicates a very close match, one can be highly confident in the accuracy of the result. However, if the BER is high, then the result is less trustable. Furthermore, when more than one piece of accessory information is used in a logical AND manner, one is not constrained to use only fixed thresholds for them. For example, if the threshold d_A is initially 0.2 seconds, and the BER threshold is 12%, but the BER of a current search is extremely low, such as 0.1%, then one can relax the threshold d_A from 0.2 sec to say 0.3 sec with a strong confidence. This may be referred to as dynamic thresholding. The exact amount of adjustment in such dynamic thresholding can be determined by the implementer, using probabilistic analysis to ensure that the number of false matches resulting from such dynamic thresholding is negligible.

If the result is inconclusive after combining three searches, instead of giving up and claiming that the excerpt does not belong to the database, one may perform more searches and combine all the results. For example, in the case of FIG. 4(b), one may perform two more searches. If the excerpt really belongs to piece A, but the second search somehow returns the wrong time location, then with two more searches it is very likely one of these two searches will also return piece A with the right time location. However, when combining five searches, the definition of a voting scheme becomes more complicated. In an example of a simplified implementation, one may define that the two searches (out of five) returning the same piece and that are most consistent in terms of time locations as the winner, in the manner that the "min" and "argmin" operators are used in the pseudocode above.

Thus, in accordance with aspects of the present invention, fingerprint search accuracy may be improved by combining results from multiple searches. Preferably, in accordance with other aspects of the present invention, such results are intelligently combined.

In the aspects of the present invention described above, a type of voting based on available information in the search results is employed to improve fingerprint search accuracy. The main available information is the (supposed) title of the searched piece (the query excerpt). The accessory available information, which can substantially improve the accuracy in combining the results, includes parameters such as $t_{offset}$ (as described above) or $t_{distance}$ and a measure of distance, such as BER. The parameter $t_{distance}$ represents the linearity of time locations between the query piece and the found piece(s): the closer the time locations are to a straight line, obtainable by linear regression, the more confident one should be about the match in the results. The $t_{distance}$ parameter is described further below in connection with FIG. 6.

Similarly, the BER, derived from Hamming distance, indicates how different the found piece is from the query piece. The higher the BER is, the more different they are from each other, and the lower the BER is, the less different and more resembling they are with respect to each other. All else being equal, should be more confident of a match with a lower BER than a match with a higher BER.

Figure 5:
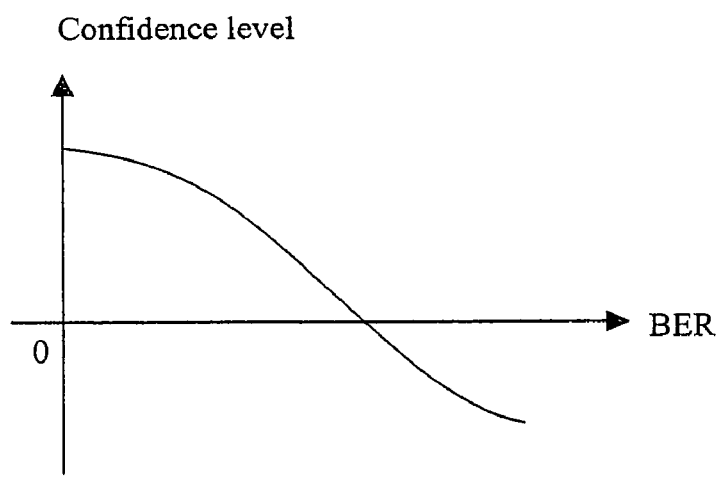
FIG. 5 is an example of the manner in which a confidence level may be mapped as a function of the bit error rate (BER).

Therefore, the values of accessory information exhibit a degree of confidence in their corresponding search results. One approach to intelligently combine them, outlined here, is to use confidence levels of individual values of accessory information as weights during the combination of results. FIG. 5 shows an example of confidence level as a function of BER. One may refer to such function as $f_B(BER)$.

Although in the previous example BER is mapped to a confidence level, such a measure of difference is not critical to the invention and other forms of difference measure may also be used. A fingerprint may be viewed as a vector of numbers. In the case of Hamming distance and BER, it is viewed as a vector of binary numbers, i.e., a binary vector. Each dimension of such a vector is just one bit, but one may envision a fingerprint vector of numbers other than binary, and the size of each dimension may even be different across different dimensions, although it should be predictable. Thus, more generally, the measure of difference may be an Lp norm measure in which a p-th root of the sum of the p-th power of absolute values of distance over each dimension of a vector that constitutes a fingerprint is obtained. The BER is based on Hamming distance, which is a L1 norm difference measure (sum of absolute values of difference at each dimension, where each dimension is 1 bit). There could also be L2 norm difference measure (where a square root of sum of square of absolute values of difference is obtained), although L2 norm is similar to L1 norm when each dimension is 1 bit. There could be also a difference measure by auto-correlation, where a higher value denotes closer match.

Figure 7:
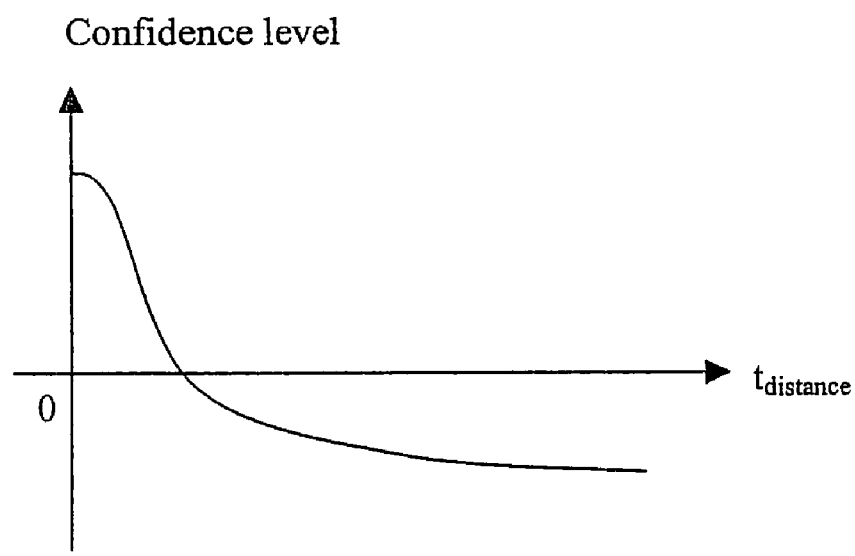
FIG. 7 is an example of the manner in which a confidence level may be mapped as a function of time difference in relative time locations between the time of the fingerprint query and the time of the fingerprint found in a database.

Similarly, one can measure how far the time location of a potential match to a query fingerprint in a database is away from its supposed location as predicted, for example, by linear regression. This is shown in FIG. 6, where $time_{query}$ is the time location of the query fingerprint, and $time_{found}$ is the time location of a potentially matching fingerprint in the found piece, and the pair of these two values is shown as a diamond shape in FIG. 6. Linear regression is then performed on these diamond points. The deviation of each diamond point from its resulting linear regression prediction (the straight line) is referred to as the time location distance or $t_{distance}$, shown as vertical lines in FIG. 6. Then one can map this distance to a confidence level, as shown in FIG. 7. We may refer to such function as $f_t(t_{distance})$. Any suitable type of linear regression may be employed. Any of various techniques for removing outliers may be employed prior to performing linear regression or as part of the linear regression process.

Figure 4A:
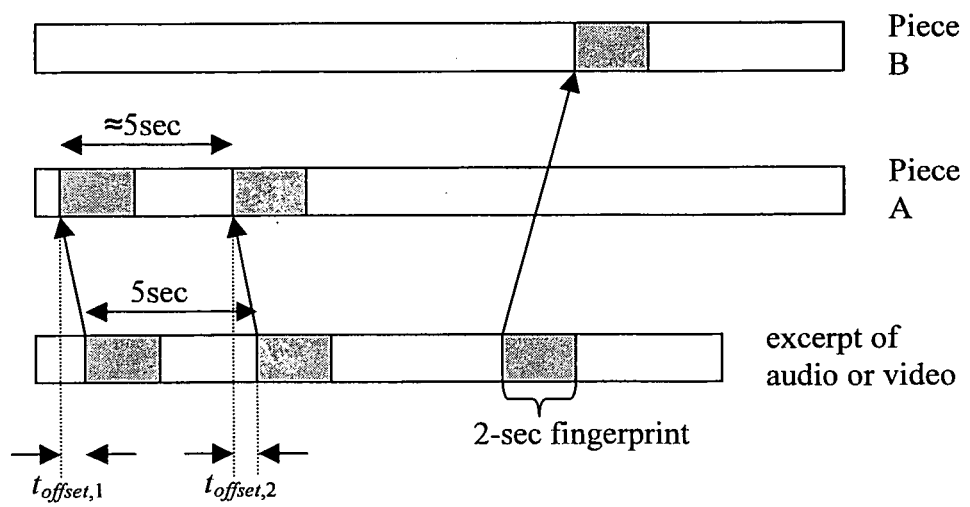
FIG. 4a is a schematic conceptualization of an example of fingerprint-matching search results with respect to three searches in which time locations are consistent for two of three potential matches.
Figure 4B:
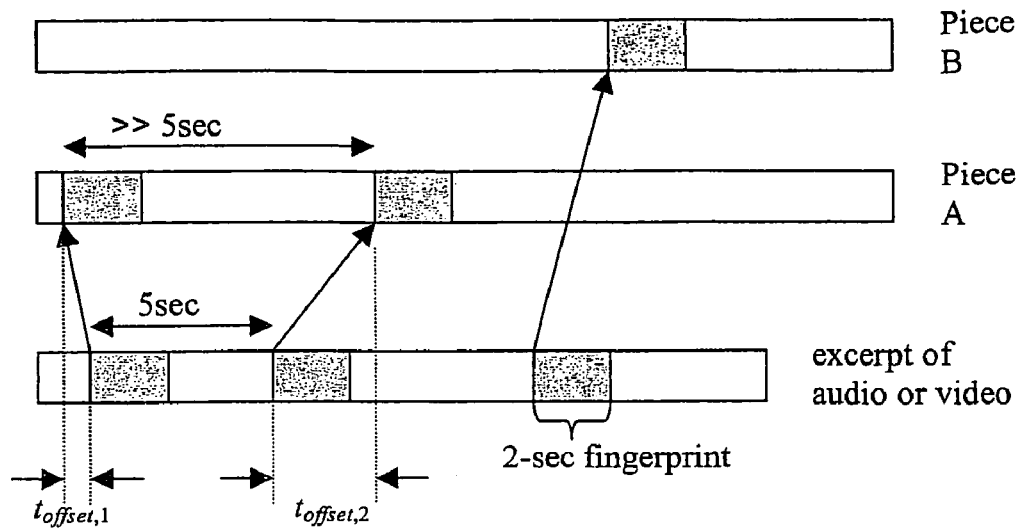
FIG. 4b is a schematic conceptualization of an example of fingerprint-matching search results with respect to three searches in which time locations are not consistent for two of three potential matches.

As mentioned above, the $t_{distance}$ parameter is a more generalized form of the $t_{offset}$ parameter. An example using the $t_{offset}$ parameter is shown in FIGS. 4a and 4b. It measures the offset between a time location in the query excerpt and the corresponding time location in a match. If consecutive fingerprint matches are correct it should roughly be a constant, but not necessarily close to zero (because of the uncertain absolute time of the query material) value when there is no speed-up or speed-down. The parameter $t_{distance}$ is more general, as shown in FIG. 6. It measures the vertical distance between a sample point (whose X and Y coordinates are the time locations in the query excerpt and the match, respectively) and the straight line obtained by any of various suitable forms of linear regression. The $t_{distance}$ parameter is supposed to be closed to zero if it corresponds to a good match. The notion of $t_{distance}$ works even when there is a speed-up or speed-down, because it uses linear regression and it does not assume the slope of linear regression to be one, as does the $t_{offset}$ parameter. It will also be noted that because the $t_{offset}$ parameter assumes a slope of one, it is possible to check the consistency of $t_{offset}$ for only two time locations. However, when using $t_{distance}$, because one does not assume the slope to be one, one needs at least three time locations to obtain a non-trivial linear regression (although one may, if desired, use at least two time locations to obtain a linear regression, and then discard any slope that is too far from slope of one).

Note that in FIG. 7, the confidence level drops more rapidly than in FIG. 5. This is because we expect that in typical implementations, the tolerance for BER may be relatively high, whereas any non-trivial amount of $t_{distance}$ is an indication that the result is much less reliable. In addition, since two points always produce a line that passes through them perfectly, the use of confidence level based on $t_{distance}$ should only be considered where there are three or more points.

An example of a procedure, in accordance with aspects of the present invention, for combining confidence levels and determining the outcome of search results intelligently is shown in the following pseudocode.

Exemplary pseudocode for combining confidence levels and determining the outcome of search results may be expressed as:

```
For ( X in set of unique pieces in the results) {
  For (i in where search[i].piece == X) {
    Confidence1 = f_B(search[i].BER);
    If (the set where results[i].piece == X has >=3 points)
      Confidence2 = f_t(search[i].t_distance);
    Else
      Confidence2 = 0;
    Total_score[X] += Confidence1 + Confidence2;
  }
  Pick X for which Total_score[X] is the highest;
  If (Total_score[X] > threshold)
    Return "the query excerpt is piece X";
  Else
    Return "unknown query excerpt";
```

As indicated in the pseudocode, first map the BER and $t_{distance}$ to their corresponding confidence levels, and then combine them. In this example, the combining is simply a summation operation, although one may use other operations such as multiplication (the confidence levels would then have to be non-negative), as long as the combining operation is a monotonic non-decreasing function with respect to each of the confidence levels. If $f_B(\ )$ always returns 1, and $f_t(\ )$ always returns 0, and the variable "threshold" has value N/2 where N is the number of searches conducted, then the procedure expressed in the pseudocode is reduced to a simple majority voting scheme. In practice, one should choose the functions $f_B(\ )$ and $f_t(\ )$ such that they maximize the probability that the final output is correct.

IMPLEMENTATION

The invention may be implemented in hardware or software, or a combination of both (e.g., programmable logic arrays). Unless otherwise specified, the methods or algorithms included as part of the invention are not inherently related to any particular computer or other apparatus. In particular, various general-purpose machines may be used with programs written in accordance with the teachings herein, or it may be more convenient to construct more specialized apparatus (e.g., integrated circuits) to perform the required method steps. Thus, the invention may be implemented in one or more computer programs executing on one or more programmable computer systems each comprising at least one processor, at least one data storage system (including volatile and non-volatile memory and/or storage elements), at least one input device or port, and at least one output device or port. Program code is applied to input data to perform the functions described herein and generate output information. The output information is applied to one or more output devices, in known fashion.

Each such program may be implemented in any desired computer language (including machine, assembly, or high level procedural, logical, or object oriented programming languages) to communicate with a computer system. In any case, the language may be a compiled or interpreted language.

Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

A number of embodiments of the invention have been described. Nevertheless, it will be understood that various modifications may be made without departing from the spirit and scope of the invention. For example, some of the steps described above may be order independent, and thus can be performed in an order different from that described. Accordingly, other embodiments are within the scope of the following claims.

The invention claimed is:

1. A method for use in identifying a segment of audio and/or video information, comprising
   obtaining a query fingerprint at each of a plurality of spaced-apart time locations in said segment,
   searching fingerprints in a database of fingerprints for a potential match for each such query fingerprint,
   obtaining a confidence level of a potential match to a found fingerprint in the database for each such query fingerprint, wherein the confidence level is a function of the relative timing relationship between the time location of a query fingerprint and the time location of a found fingerprint, and
   combining the results of searching for potential matches either to identify said segment of audio and/or video information or to conclude that said segment does not belong to the database, wherein each potential match result is weighted by a respective confidence level.

2. The method according to claim 1 wherein a confidence level is also a function of a measure of difference between a query fingerprint and a found fingerprint.

3. The method according to claim 2 that comprises:
   identifying said segment of audio and/or video from a search having a minimum difference in relative timing between query fingerprints and found fingerprints if the minimum difference is less than a threshold, wherein the threshold varies depending on a number of searches that identify the same segment of audio and/or video.

4. The method according to claim 2 wherein:
   the relative timing relationship between the time location of query fingerprints and the time location of found fingerprints is a difference in time location, and
   query fingerprints are deemed to identify a segment of audio and/or video information if the difference in time between the query fingerprints and found fingerprints is a minimum and is less than a dynamic threshold that is raised when the measure of difference between query fingerprints and found fingerprints is low.

5. The method according to claim 1 wherein said time locations are spaced apart so as to minimize correlation of the search results between or among query fingerprints.

6. The method according to claim 1 wherein there are multiple sets of spaced-apart time locations and the results of searching for each of the multiple sets are combined.

7. The method according to claim 6 wherein the results of searching are combined within each set and the results of such combinations are further combined.

8. The method according to claim 6 wherein the results of searching are combined across all sets.

9. The method according to claim 1 that comprises determining confidence of the combined results of searching using a measure of confidence of a linear trend of the relative timing relationships between the time location of the query fingerprint and the time location of the potentially matching found fingerprint at the time locations.

10. The method according to claim 1 wherein:
    the results of searching are combined by a voting scheme,
    the combining is cascaded by additional iterations of multiple searches in the event of inconclusive votes, and
    votes are either considered only in new iterations or are combined with some or all previous votes.

* * * * *